United States Patent [19]

Krempl et al.

[11] 4,413,202
[45] Nov. 1, 1983

[54] TRANSDUCER WITH A FLEXIBLE SENSOR ELEMENT FOR MEASUREMENT OF MECHANICAL VALUES

[75] Inventors: Peter Krempl, Vienna; Peter Claassen; Helmut List, both of Graz, all of Austria

[73] Assignee: Hans List, Graz, Austria

[21] Appl. No.: 482,279

[22] Filed: Apr. 11, 1983

Related U.S. Application Data

[63] Continuation of Ser. No. 107,315, Dec. 26, 1979, abandoned, which is a continuation of Ser. No. 927,929, Jul. 25, 1978, abandoned.

[30] Foreign Application Priority Data

Jul. 27, 1977 [AT] Austria ............................. A5505/77

[51] Int. Cl.³ ............................................. H01L 41/08
[52] U.S. Cl. ..................................... 310/338; 310/800
[58] Field of Search ........................... 310/330–332, 310/338, 339, 345, 800; 179/110 A; 73/774–778, 780, 781, 700, 702, 715–718, 723, 724, 729, 753, 754

[56] References Cited

U.S. PATENT DOCUMENTS

| | | |
|---|---|---|
| 3,631,439 | 12/1971 | Nichols ........................... 310/338 X |
| 3,798,474 | 3/1974 | Cassand et al. ................. 310/800 X |
| 3,832,580 | 8/1974 | Yamamuro et al. ............. 310/800 X |
| 3,893,342 | 7/1975 | Florian ............................ 310/329 X |
| 3,900,830 | 8/1975 | Peterson ......................... 310/338 X |
| 3,903,733 | 9/1975 | Murayama ...................... 310/800 X |
| 3,935,485 | 1/1976 | Yoshida .......................... 310/800 X |
| 3,947,644 | 3/1976 | Uchikawa ....................... 310/800 X |
| 3,973,150 | 8/1976 | Tamura ........................... 310/800 X |
| 4,008,408 | 2/1977 | Kodama .......................... 310/800 X |
| 4,051,395 | 9/1977 | Taylor ............................. 310/329 X |
| 4,071,785 | 1/1978 | Yoshida .............................. 310/331 |
| 4,156,800 | 5/1979 | Sear et al. ...................... 310/800 X |
| 4,268,912 | 5/1981 | Congdon ........................ 310/337 X |

OTHER PUBLICATIONS

Pressure Gauge, De Micheal, Abstract Published in O.G., vol. 651, p. 1585, Apr. 29, 1952.

*Primary Examiner*—Mark O. Budd
*Attorney, Agent, or Firm*—Watson, Cole, Grindle & Watson

[57] ABSTRACT

A transducer with a flexible sensor element for measurement of mechanical values, at least one flexible piezoelectric sensor element being provided for piezoelectrical or capacitive measurement, the opposite surfaces of the sensor element being at least partially connected to electrically leading contact surfaces.

10 Claims, 15 Drawing Figures

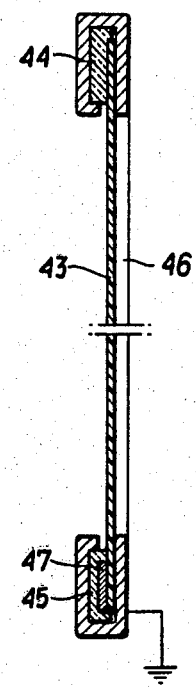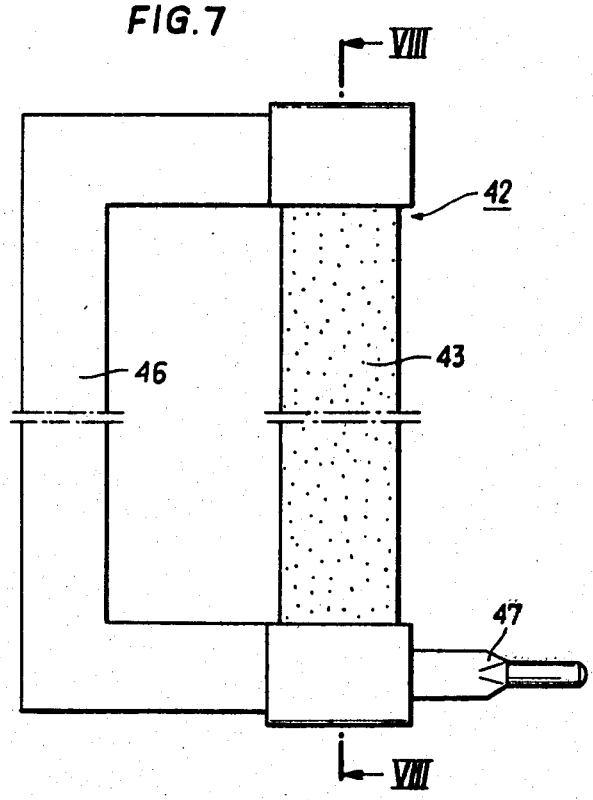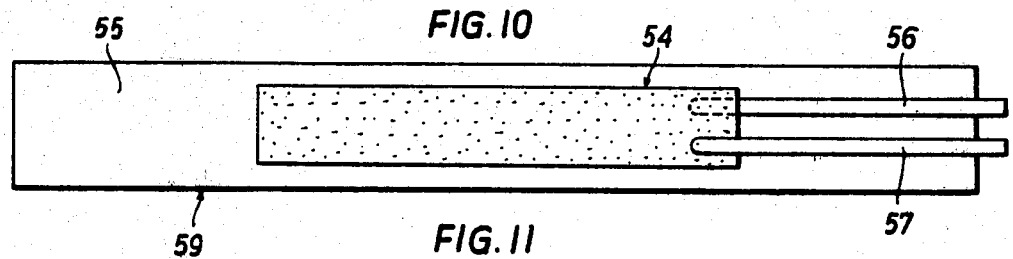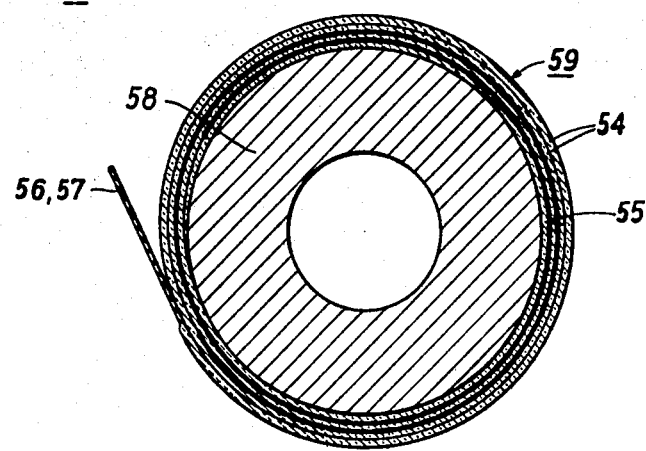

TRANSDUCER WITH A FLEXIBLE SENSOR ELEMENT FOR MEASUREMENT OF MECHANICAL VALUES

This application is a continuation application of application Ser. No. 107,315, filed Dec. 26, 1979, which in turn is a continuation of Ser. No. 927,929, filed July 25, 1978, both of which are now abandoned.

BACKGROUND OF THE INVENTION

This invention relates to a transducer with a flexible sensor element for measurement of mechanical values.

DESCRIPTION OF THE PRIOR ART

Transducers with a flexible sensor element are known in the form of strain gauges. Strain gauges usually are attached on the body to be measured mainly by means of an adhesive. Forces acting on the body and deforming it cause a corresponding stretch of the strain gauge, the stretch being measurable due to a change in the electrical resistance of the strain gauge wires. Such strain gauges have a number of advantageous properties, for instance, flexibility and small mass, and they are well suitable for both static and dynamic measurements. However, an arrangement is necessary which guarantees a reproducible initial tension of the strain gauge. In cases where the initial tension is subject to greater variations caused by mounting, thermal expansion or the like, the necessary adjustment of the expensive measuring bridge needs additional activities. Such additional work can never be avoided when the dynamic stretches to be measured are in the order of $10^{-5}$ and lower. The mentioned difficulties happen to all strain gauges in which their physical properties are used to measure variations of length and which depend on the absolute value of the length. Due to mentioned disadvantages, strain gauges are a not satisfactory solution for a broad range of measuring problems.

In many cases of measurement of mechanical values, for instance pressure, forces, and acceleration, often piezoelectric transducers are used. This type of transducer has advantageous properties, e.g., direct measurement of relative variations from any given ground level, compression sensitivity, and simple electronic processing of the charge signals. The known piezoelectric transducers have discs or pins of monocrystals or ceramics as piezoelectric sensors which are to be hold under compressive initial tension by a special device. The initial tension is necessary for transmission of measured outer forces or pressures to the sensor. With acceleration and vibration transducers the initial tension must be chosen sufficiently high that the seismic mass is pressed against the sensor on the whole measuring range. This necessary initial tension and the necessary rigid abutment cause an arrangement having a big mass.

Common pressure transducers are pressed against the measuring point by means of a membrane connected to a pressure transmission plate. This results in limitations in the sensitivity and the dynamic measuring range of the transducer. The compact, fixed outer shape of this transducer type limits its use for measuring problems where simple mounting and adaptability to present geometric situations is required. In addition, the relatively great mass and the resulting strongly limited dynamic resolution capacity of such transducers are often very disadvantageous.

Some typical measuring problems for which common piezoelectric transducers are not satisfactory are for example: dynamic measurement of low pressure differences between two measuring chambers, measuring of passing shock waves in fluids, high-sensitive acceleration transducers of light weight, dynamic measurement of flow velocity of fluids, and measurement of high frequency vibrations of two bodies relatively to each other.

SUMMARY OF THE INVENTION

The present invention avoids the mentioned disadvantages and consists in that at least one flexible piezoelectric sensor element is provided for piezoelectric or capacitive measurement, the opposite surfaces of the sensor element being at least partially connected to "electrically leading" contact surfaces.

The design of a transducer according to the invention enables simultaneous use of the advantageous properties of strain gauges—flexibility, little mass and therefore high temporal resolution, stretchability and stretch sensitivity—and of the advantageous properties of piezoelectric sensors—direct measurement of relative variations from any given ground level (floating zero point), compression, sensitivity, simple electronic processing of the charge signals—, whereby the disadvantages of both transducer principles are avoided.

The piezoelectric film which is advantageously chosen only a few $\mu$ thick forms the dielectric of a compacitor, the "electrically leading" surfaces being used as the capacitor electrodes. The sensor element therefore can be used also for capacitive measurement of pressure distribution. This is an essential advantage because static or quasi-static and low frequent processes which cannot be measured piezoelectrically due to the limited insulation resistance, can be measured capacitively. The use of a flexible, piezoelectric film as a sensor element in a pressure transducer allows for the first time the application of one and the same transducer alternatively for piezoelectric or capacitive measurement of pressure distribution without the necessity of additional mounting expenditure.

There are known a number of flexible dielectrics in the form of foils or films, most of which may be considered as electrets in the sense that they posses a semi-permanent electric polarisation, the outer field of which is compensated by also semi-permanent surface charges. Such piezoelectrics show a longitudinal piezoelectric effect in the direction of the Z-axis (axes according to the IRE-convention) and transversal piezoelectric effects in the direction of the X- or Y-axis, respectively. Some known piezoelectrics are for instance Polyvinylidene-Fluoride (PVDF), Polyvinyl-Fluoride (PVF), Polyvinyl-Chloride (PVC), Polyacrylonitrile (PAN). Polymethyl-Methocylate (PMMA), fluorinized Ethylene-Propylene (FEP). Polystyrene Polyethylene (PE) and its Terephthalate, Polycarbonate, Polysulfone and Nylon.

Besides the advantage of the possibility of piezoelectric and capacitive measurement of stretches, the use of a piezoelectric electret according to the invention has the further advantage in that elastic cross-contraction in Z-direction an amplification of the piezoelectric and capacitive stretch sensitivity is obtained. Enlargement of a pipe further may be measured by means of a transducer according to the invention also by the longitudinal piezo effect if the sensor element is so attached that the pipe stretch exerts pressure perpendicular to the surface of the sensor element. In many embodiments according to the invention the piezoelectric film will be subject to forces which cause stretches in the film parallel to the surface and pressure perpendicular to the surface of the film. This combination of stretch and pressure causes an especially high sensitivity in many embodiments.

It is further advantageous to provide a piezoelectric film consisting of a monoaxial-orientated polymer. Polymers of this kind have an especially high piezoelectric sensitivity, therefore, they are particularly suitable for transducers in the sense of the invention.

According to the invention the piezoelectric film may consist of Polyvinylidene-Fluoride, preferably of monoaxial-orientated β-Polyvinylidene-Fluoride. Among the mentioned piezoelectric polymers Polyvinylidene-Fluoride has an especially high piezoelectric sensitivity and a big dielectric constant. Ordinary PVDF is a mixed form of α- and β-PVDF. The α/β-mixed form of PVDF can be brought into the monoaxial-orientated β- form by stretching the PVDF-film inelastically, whereby the direction of the maximal sensitivity is identical with the direction of stretch. A PVDF-film pretreated in this manner has an especially high piezoelectric stretch sensitivity in X-direction which is about ten times higher than the sensitivity in Y-direction. This high piezoelectric sensitivity and the eminent chemical and physical stability makes this material particularly suitable for use as a piezoelectric film.

According to a further feature of the invention the transducer comprises two piezoelectric films having their "electrically leading" contact surfaces layed one upon the other in a manner wherein the crystallographical Z-axes of both films are directed non-parallel, the X-axis of one film enclosing an angle of 90 degrees with the X-axis of the other film. Between the two films also after "may" other layers may also be interposed. If this sensor element is subject to stretch with both films being stretched in the manner. The electrodes of equal polarity will produce a total signal which is a measure for the relative surface stretch of the sensor element. By this embodiment an eventually present directional anisotropy of the piezoelectric film is compensated for. This compensation is necessary for instance for a precise measurement of surface stretch. Therefore the described embodiment has the advantage that for measurement of surface stretch monoaxial-orientated piezoelectric films may also be utilized. The high sensitivity of which is combined with the required isotropy by this arrangement. Of course the sensor element may be built up by a number of layers, each of them thereby consisting of two piezoelectric films and electrodes like above described.

According to an advantageous further embodiment the piezoelectric film is a strip under initial tension of a monoaxial-orientated polymer, the direction X' of the initial tension and the direction of orientation X of the film enclosing an angle less then 45 degrees. By this arrangement linearity and sensitivity of the transducer can be optimized.

In another embodiment a transducer for measurement of stretches is provided, the stretch of a body to be measured (or the variation of the distance between two bodies) being transformed directly into stretch of the piezoelectric film by means of a simple device. By the direct transforming of the measured value (stretch) expensive interfaces which may be additional sources of measuring errors can be avoided.

A range of application of special importance for transducers according to this invention is the determination of pressure difference between two pressure volumes. For this application the piezoelectric film can be dividingly stretched over an aperture connecting the two spaces which present the pressure difference to be measured. Differential pressure transducers of this kind are very sensitive and especially suitable for the measurement of high frequent pressure variations in one of both pressure volumes. In case one of the two spaces is a closed chamber at defined pressure or else evacuated, this arrangement also enables the determination of the absolute pressure in the second chamber or space. This embodiment represents a piezoelectric and capacitive pressure transducer of high sensibility and dynamic, simultaneously being of very simple design.

The described pressure transducer may be further developed in a manner wherein the piezoelectric film is stretched over a membrane supporting the film. The membrane seals the two spaces against each other and supports the film so that its pressure loading capacity is increased. The membrane may be chosen in a manner to gain linearization of the piezoelectric transducer.

A transducer according to the invention is also usable for measurement of flow velocity or mass flow rate of a fluid if the piezoelectric film is arranged transversely to the flow direction of the fluid, having apertures through which the fluid flows, thereby exerting force on the film. A transducer of this kind possesses a high temporary resolution capacity and an especially high sensitivity and is for these reasons well suitable for measurement of rapid variations of flow velocity. In case the fluid is electrically conducting at least one of the contact surfaces of the piezoelectric film must be insulated against the fluid by an additional coating.

According to further development of the invention to enable acceleration or vibration measurements the transducer comprises a piezoelectric film and a seismic mass, the seismic mass causing stretch of or pressure on the piezoelectric film when the transducer is accelerated. Thereby it is especially advantageous to arrange the seismic mass between two strips of piezoelectric film, each provided with electrodes, the electrodes of the one strip being connected to this electrodes of the other strip having inverse polarity. By these means an acceleration and vibration transducer of very simple design and high resolution capacity is obtained.

For a special range of application it may be very advantageous to provide an arrangement wherein the piezoelectric film provided with electrodes is supported by a frame-like stretch device. This unrestrained spreading makes the sensor element already sensitive to very little forces, direct touch of the sensor element thereby being not necessary. For this reason a transducer of this kind may be utilized for measurements of velocity of fast moving bodies, especially ballistic measurements, whereby the transducer consists of at least two sensor elements arranged in a distinct distance from each other and forming a measuring range, the moving body acting directly or indirectly, for instance over half-generated pressure waves, upon the sensor elements. Such a measuring device enables high accuracy and is preferably suitable for the determination of the average velocity at large measuring distances.

DESCRIPTION OF THE DRAWINGS

The invention will be hereinafter more specifically explained with reference to some exemplary embodiments depicted in the accompanying drawings, wherein FIG. 8 is a sectional new taken along line VII—VII of FIG. 7, FIG. 10 shows another transducer according to the invention in a stretched view, FIG. 11 a transducer according to FIG. 10 mounted on a pipe, FIG. 12 shown a further transducer according to the invention.

DESCRIPTION OF THE PREFERRED EMBODIMENTS

Figure 1:
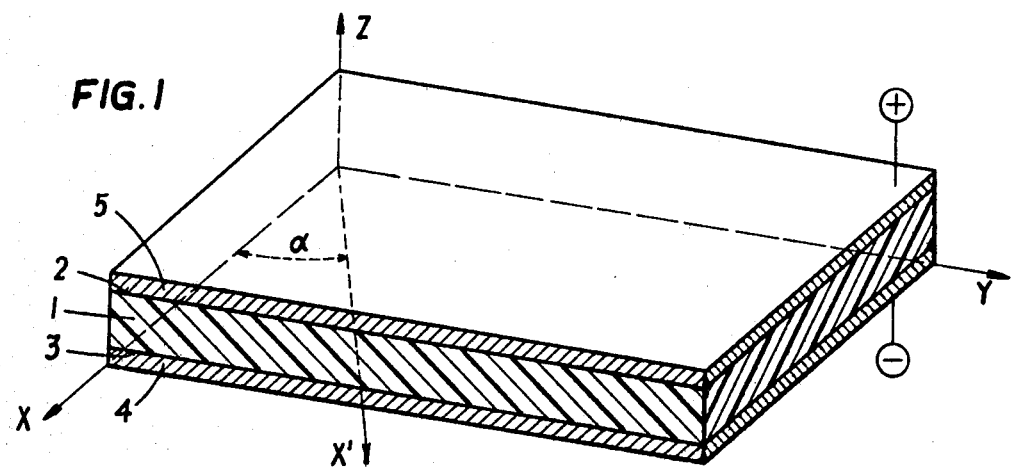
FIG. 1 is a section of a sensor element according to the invention in schematic representation, FIGS. 2 and 3 each show an embodiment according to the invention in cross section.

FIG. 1 is a section of a piezoelectric film 1 forming a sensor element having contact surfaces 2 and 3, the crystallographical axes of the sensor element being shown at X, Y, and Z. With monoaxial-orientated polymers direction X is chosen as the direction of the maximal stretch sensitivity parallel to the surface of the film. The direction of the initial tension is shown at X'. In most applications it will be advantageous to have angle α between the direction X of maximal stretch sensitivity and direction X' of inital tension zero or minor 45 degrees. Contact surfaces 2 and 3 of film 1 are each formed by an electrically leading layer 4, 5 consisting of metal evaporated on the film or of a conductive varnish. At least at one of the contact surfaces 2, 3 may be provided with an insulated electrical connection leading to a charge collector or directly to an electrical measuring chain.

Figure 2:
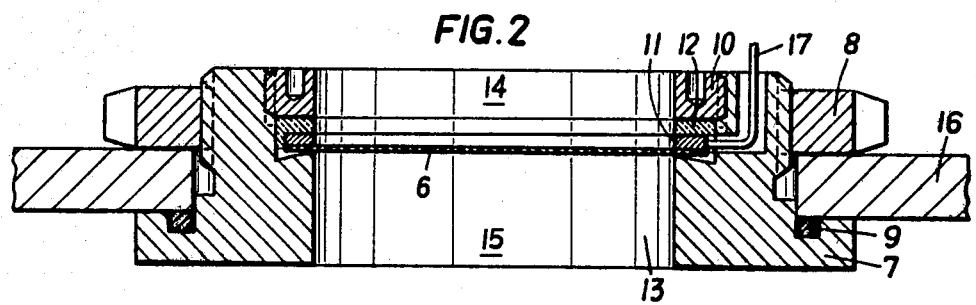

The differential pressure transducer shown in FIG. 2 comprises piezoelectric film 6 which is stretched by a special device over a cylindrical aperture 13 thereby sealing spaces 14 and 15 against each other the pressure difference between which is to be measured. The device comprises an annular housing 7 inserted into a dividing wall 16 between spaces 14 and 15, housing 7 being secured to dividing wall 16 by means of central nut 8, sealing at this range being made by a washer 9. Piezoelectric film 6 is located within a recessing enlargement of aperture 13 and is held there by a threaded ring 10 over a ring 11 of electrically insulating material, and a ring 12 of electrically leading material. Ring 12 serves for charge take off from the upper side of film 6 over a leader 17. Charge from the lower side of film 6 is conducted over grounded housing 7.

Figure 3:
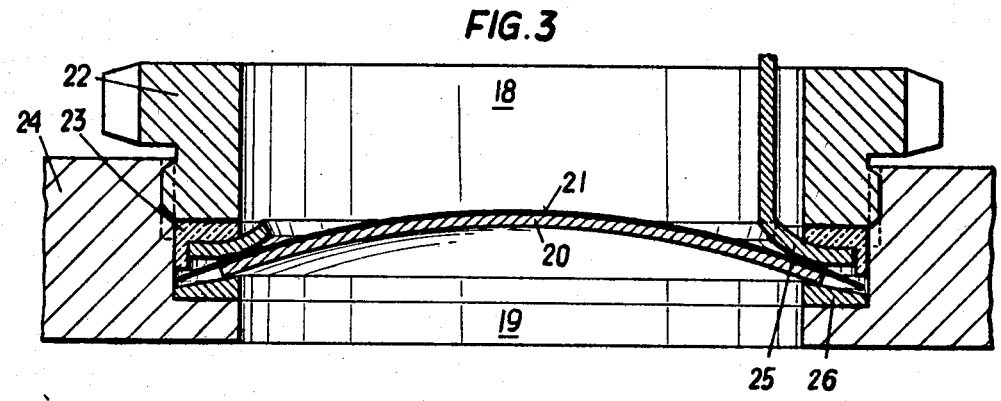

FIG. 3 shows a differential pressure transducer in cross section. Spaces 18 and 19 are divided and sealed against each other by a domed membrane 20 which simultaneously supports a piezoelectric film 21. Membrane 20 and film 21 are secured by a screw 22 to a dividing wall 24, an insulating layer 23 being interposed therebetween. Charge is taken off over contact ring 25, the other electrode of film 21 being electrically connected to the grounded dividing wall 24 over membrane 20 and a washer 26.

Figure 4:
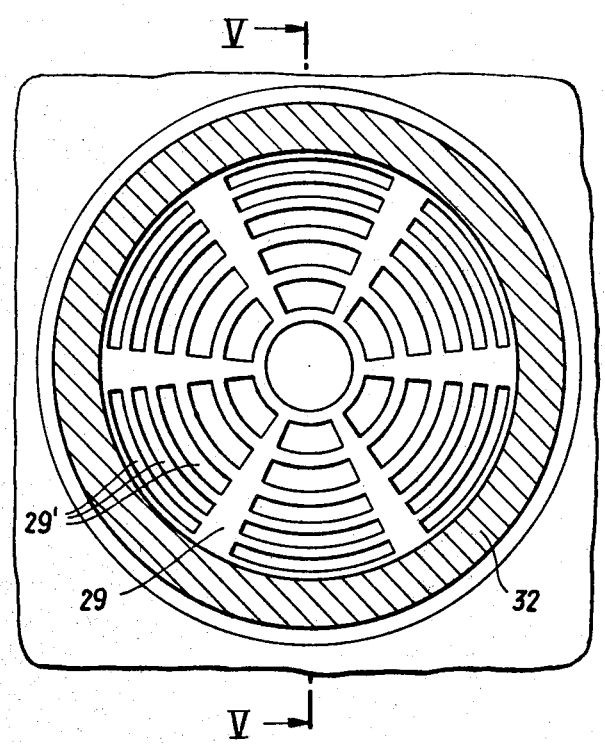
FIG. 4 is a further embodiment, partially in plan view, FIG. 5 in a sectional view taken along line V—V of FIG. 4.
Figure 5:
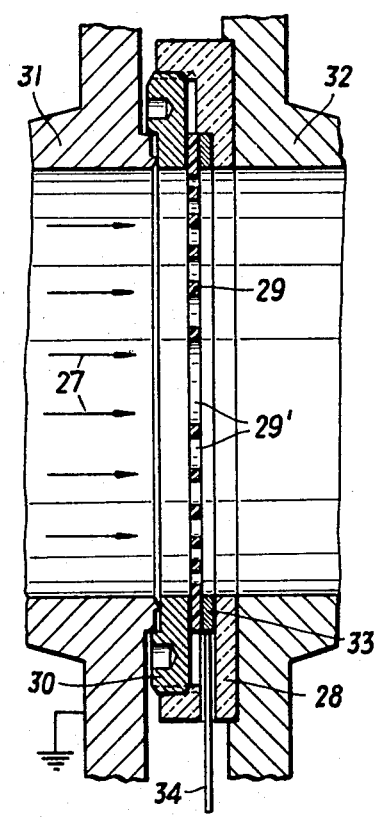

FIGS. 4 and 5 show a piezoelectric transducer for measurements of the flowing velocity of electrically non-leading fluids. The transducer comprises a piezoelectric film 29 having holes 29' and being stretched by means of a ring 28 perpendicular to a flow direction 27 of the fluid. The opposite sides of film 29 are coated with an electrically leading layer. Holes 29' permit passing of the fluid whereby film 29 is subject to stretch by the fluid. The stretch being a measure of the flow velocity. If the fluid is electrically leading at least one of the contact surfaces of film 29 must be electrically insulated against the fluid. Film 29 is clamped between pipe flanges 31 and 32 by a device consisting by holding rings 30 and 28. Charge on one side is taken off over an electric contact ring 33 and a leader 34, and on the other side over ground such as depicted in the drawing.

Figure 6:
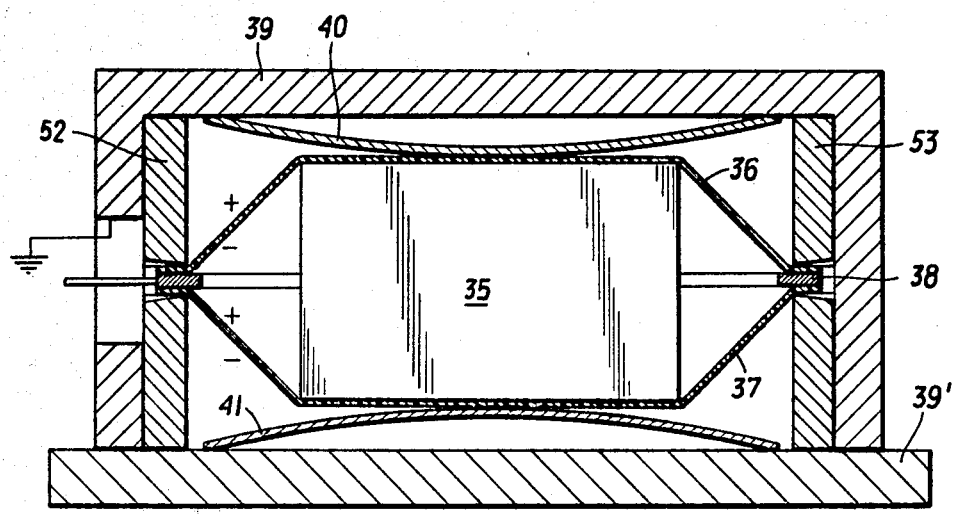
FIG. 6 shows an acceleration transducer according to the invention in cross section, FIG. 7 shown a stretch device for a sensor element.

With the acceleration transducer shown in FIG. 6 a seismic mass 35 is arranged between piezoelectric film strips 36 and 37 which are with their electrodes of inverse polarity in contact with seismic mass 35 and a charge take off contact 38. The electrodes averted from seismic mass 35 are mounted in support plates 52 and 53 and they may be grounded over housing 39 which comprises bottom plate 39'. When the transducer is accelerated one of films 36, 37 is stretched and in each case the other film is elastically contracted so that the total charge present at contact 38 is a measure for the direction and the amount of acceleration. Seismic mass 35 may be supported by springs 40, 41 so that the proper frequency and measuring range of the transducer can be optimized by suitable choice of the spring characteristics. Charge is taken off over contact strip 38 and over ground such as shown in the drawing.

FIGS. 7 and 8 show a stretch device 42 for a piezoelectric film 43 which is clamped over insulating interposition layers 44, 45 to a stretching yoke 46. Charge is taken off by means of contact strips 47 and ground as indicated by the drawing.

Figure 9:
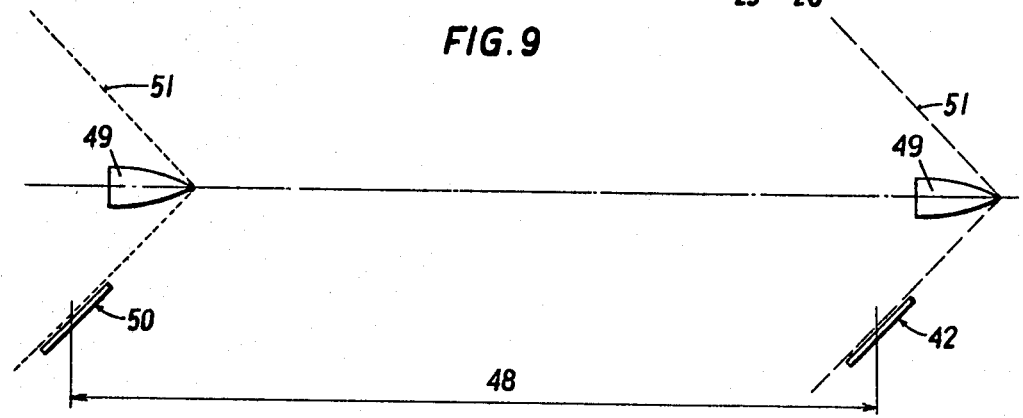
FIG. 9 shows the arrangement of two transducers according to FIGS. 7 and 8 to form a measuring range for the measurement of the velocity of a projectile.

FIG. 9 represents an arrangement of two transducers according to FIGS. 7 and 8 with a distinct distance between them forming a measuring range 48. When the instant projectile 49 or its shock wave 51 passes sensor element 50, a time measurement is released which is stopped when the projectile or its shock wave passes second sensor element 42. The velocity of the projectile then can be determined from the measured time and the known measuring distance 48. The charge signal generated by projectile 49 or its shock wave 51 may also serve for triggering of electronic and photographic devices.

According to the invention the described transducers can also be used for capacitive measuring, especially the embodiments of FIGS. 2, 3 and 4, 5 because the mechanical values to be measured with these embodiments are generally subject to slow temporary variations. Due to the limited insulation resistance of the piezoelectric film static or low frequent measurements can not be carried out piezoelectrically, so for this range of application the possibility of capacitive measurement according to the invention is a particular advantage.

FIG. 10 shows a measuring strip 59 having a measuring sensor element made of a flexible piezoelectric film 54 connected to an electrically insulating strip 55. For taking off charge leads or printed leads 56 and 57 are directly connected to (not shown) contact layers of film 54.

FIG. 11 shows an arrangement of a measuring strip 59 according to FIG. 10 on pipe 58, whereby charge take off leads 56 and 57 are only schematically indicated. Measuring strip 59 embraces pipe 58 totally. The described transducer may be used for instance to register the pulse of humans or animals.

Figure 12:
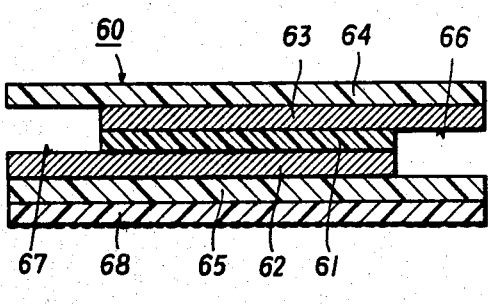

FIG. 12 shows a measuring sensor element 60 with flexible film 61 being connected to electrically leading contact layers 62 and 63 by frictional connection or by an electrically leading adhesive. Contact layers 62 and 63 may be made advantageously like a printed circuit using copper coated flexible laminates 64 and 65. The measuring signal is taken off at poles 66 and 67. For easy mounting of the sensor element at the object to be measured self-adhesive foil 68 is provided.

Figure 13:
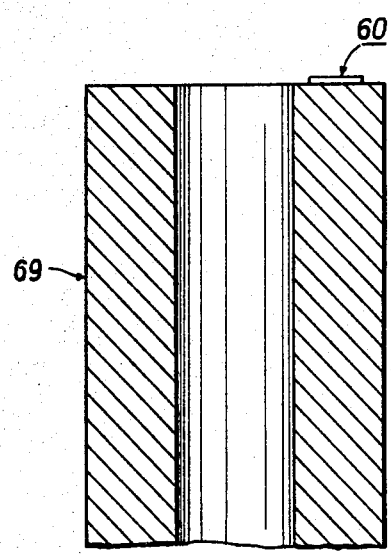
FIG. 13 is an example of application of the transducer according to FIG. 12.

FIG. 13 shows an example of application of a measuring sensor element 60 as shown by FIG. 12, being arranged at the front side of a pipe 69, for instance for measurement of effusion phenomenons, with this arrangement especially determination of the instant of escape of non-steady supersonic flow is easily made possible.

Figure 14:
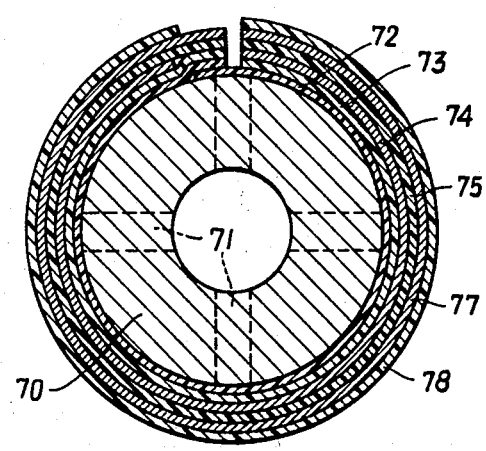
FIG. 14 is a section of a further embodiment according to the invention.
Figure 15:
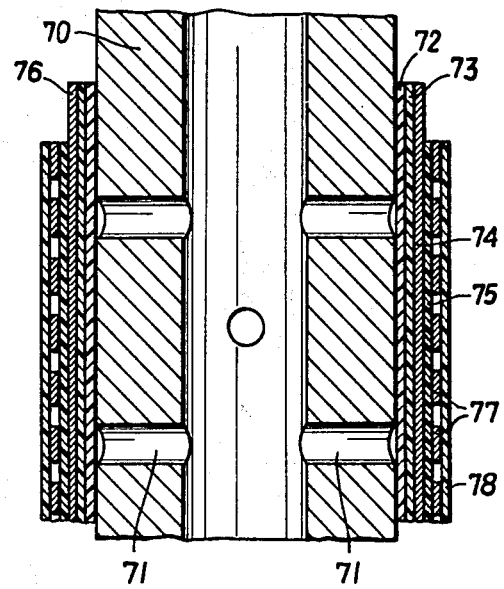
FIG. 15 is a sectional view taken along line XV—XV of FIG. 14.

FIGS. 14 and 15 show an example of application of a transducer having a number of single transducers integrated to a unit. The transducer may be applied for measurements to determine pressure or pressure distribution within pipe 70 having bores 71 between its inner and outer surfaces. The described measuring sensor element may also serve for temporal pressure registration within hollow bodies changing temporally their shape due to forces acting within the body as is the case with deforming or burning explosive materials.

The measuring sensor element principally has the same structure as that of FIG. 12. Self-adhesive foil 72 closes bores 71 and carries a copper coated flexible laminate 73. A continuous copper layer 74 forms one pole of the measuring sensor element built by a flexible film 75. Connection of the pole to a measuring lead is made over a free end 76 of copper layer 74. Flexible film 75 on the one hand is in connection with copper layer 74 and on the other hand with electrically leading surfaces 77. For recordation of local and temporal pressure distribution measuring signals are taken off at a number of contact surfaces 77 arranged in intervals along the longitudinal axis of pipe 77. Contact surfaces 77 may be made for instance like a printed circuit using copper coated flexible laminates 78 whereby the support layer simultaneously serves as a protective cover for the measuring sensor element. The measuring signals of the single measuring sensor elements covered by contact surfaces 77 may be taken off at the free end 76 of copper layer 74.

We claim:

1. An apparatus for determining the pressure of a fluid, said apparatus comprising
    means forming a hollow enclosure in which the fluid whose pressure is to be measured is contained, said means including a wall member which has an edge surface that is configured to provide a cylindrical orifice that communicates with the interior of said hollow enclosure, said edge surface of said wall member including a continuous step portion which extends into said cylindrical orifice and a threaded portion, said step portion being positioned closer to the interior of said hollow enclosure than said threaded portion,
    a domed membrane which has a diameter that is greater than the diameter defined by the step portion of said wall member, said domed membrane being positioned in said cylindrical orifice such that the periphery thereof is positioned between said step portion and said threaded portion of said wall member and is oriented such that the center thereof is positioned further from the interior of said hollow enclosure than said periphery,
    a transducer means which has opposite ends and is positioned against the domed membrane on the side thereof facing away from the interior of said hollow enclosure, said transducer means comprising at least one flexible piezoelectric film, at least one flexible piezoelectric film in said transducer means having opposite sides and an electrically conducting surface associated with at least a portion of at least one of the opposite sides thereof,
    attachment means for stretching said transducer means across said domed membrane and thus across said orifice, said attachment means comprising an annular screw which has a threaded outer surface, said threaded outer surface of said annular screw being engaged with the threaded portion of said wall means such that the annular screw will cause the opposite ends of said transducer means to be clamped and the transducer means to be stretched over said domed membrane.

2. The apparatus as defined in claim 1, wherein a contact ring is positioned between said annular screw and the opposite ends of said transducer means.

3. The apparatus as defined in claim 2, wherein an electrically-conducting washer is positioned between the domed member across which the transducer means is stretched and the step portion of the wall member forming said orifice.

4. An apparatus for determining the pressure of a fluid, said apparatus comprising
    means forming a hollow enclosure in which the fluid whose pressure is to be measured is contained, said means including a wall member which has an edge surface that is configured to provide an orifice that communicates with the interior of said hollow enclosure, said edge surface of said wall member including a continuous step portion which extends into said orifice and a threaded portion,
    a domed membrane which has a diameter that is greater than the diameter defined by the step portion of said wall member, said domed membrane being positioned in said orifice such that the periphery thereof is positioned between said step portion and said threaded portion of said wall member,
    a transducer means which has opposite ends and is positioned against the domed membrane, said transducer means comprising at least one flexible piezoelectric film, at least one flexible piezoelectric film in said transducer means having opposite sides and an electrically conducting surface associated with at least a portion of each of the opposite sides thereof, attachment means for stretching said transducer means across said domed membrane and thus across said orifice, said attachment means comprising an annular screw which has a threaded outer surface, said threaded outer surface of said annular screw being engaged with the threaded portion of said wall means such that the annular screw will cause the opposite ends of said transducer means to be clamped and the transducer means to be stretched over said domed membrane.

5. The apparatus as defined in claim 4, wherein each flexible piezoelectric film consists of a monoaxial-oriented polymer.

6. The apparatus as defined in claim 4, wherein each flexible piezoelectric film consists of polyvinylidenefluoride.

7. The apparatus as defined in claim 4, wherein a contact ring is positioned between said annular screw and said transducer means.

8. The apparatus as defined in claim 7, wherein an electrically-conducting washer is positioned between the domed member across which the transducer means is stretched and the step portion of the wall member forming said orifice.

9. The apparatus as defined in claim 4 wherein said orifice is circular.

10. The apparatus as defined in claim 4 wherein said step portion is positioned closer to the interior of said hollow enclosure that said threaded portion and wherein said domed membrane is positioned such that its center is located further from the interior of said hollow enclosure than said periphery.

* * * * *